US012724883B2

(12) United States Patent
Burns et al.

(10) Patent No.: US 12,724,883 B2
(45) **Date of Patent: *Sep. 1, 2026**

(54) MACHINE LEARNING MODEL ADVERSARIAL ATTACK MONITORING

(71) Applicant: HiddenLayer, Inc, Austin, TX (US)

(72) Inventors: Tanner Burns, Austin, TX (US); Chris Sestito, Austin, TX (US); James Ballard, Ottawa (CA)

(73) Assignee: HiddenLayer, Inc., Austin, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 18/660,042

(22) Filed: May 9, 2024

(65) Prior Publication Data

US 2024/0320329 A1 Sep. 26, 2024

Related U.S. Application Data

(63) Continuation of application No. 18/441,918, filed on Feb. 14, 2024, now Pat. No. 12,026,255.

(60) Provisional application No. 63/453,405, filed on Mar. 20, 2023.

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,802,298 | B1 | 9/2010 | Hong et al. |
| 9,350,748 | B1 | 5/2016 | McClintock et al. |
| 9,356,941 | B1 | 5/2016 | Kislyuk et al. |
| 9,516,053 | B1 | 12/2016 | Muddu et al. |
| 10,121,104 | B1 | 11/2018 | Hu et al. |

(Continued)

FOREIGN PATENT DOCUMENTS

EP 4024296 A1 * 7/2022 ............. G06N 20/00

OTHER PUBLICATIONS

Automorphic.ai, 2024, "Github—automorphic-ai/aegis: Self-hardening firewall for large language models," XP093278213, Available online at https://web.archive.org/web/20240222171700/https://github.com/automorphic-ai/aegis (2 pages).

(Continued)

*Primary Examiner* — Christopher C Harris
(74) *Attorney, Agent, or Firm* — Jones Day

(57) ABSTRACT

Adversarial attacks on a machine learning model are detected by receiving vectorized data input into the machine learning model along with outputs of the machine learning model responsive to the vectorized data. The vectorized data corresponds to a plurality of queries of the machine learning model by a requesting user. A confidence level is determined which characterizes a likelihood of the vectorized data being part of a malicious act directed to the machine learning model by the requesting user. Data providing the determined confidence levels can be provided to a consuming application or process. Multi-tenant architectures are also provided in which multiple machine learning models associated with different customers can be centrally monitored.

30 Claims, 9 Drawing Sheets

(56) References Cited

U.S. PATENT DOCUMENTS 10,193,902 B1 1/2019 Caspi et al.
10,205,735 B2 2/2019 Apostolopoulos
10,210,036 B2 2/2019 Iyer et al.
10,462,168 B2 10/2019 Shibahara et al.
10,637,884 B2 4/2020 Apple et al.
10,673,880 B1 6/2020 Pratt et al.
10,764,313 B1 9/2020 Mushtaq
10,803,188 B1 10/2020 Rajput et al.
10,824,721 B2 11/2020 Kesarwani et al.
11,310,270 B1 4/2022 Weber et al.
11,483,327 B2 10/2022 Hen et al.
11,501,101 B1 11/2022 Ganesan et al.
11,551,137 B1 1/2023 Echauz et al.
11,601,468 B2 3/2023 Angel et al.
11,710,045 B2 7/2023 Lee et al.
11,710,067 B2 7/2023 Harris et al.
11,762,998 B2 9/2023 Kuta et al.
11,777,957 B2 10/2023 Chen et al.
11,875,130 B1 1/2024 Bosnjakovic et al.
11,893,111 B2 2/2024 Sai et al.
11,893,358 B1 2/2024 Lakshmikanthan et al.
11,930,030 B1 3/2024 Burns et al.
11,930,039 B1 3/2024 Geethakumar et al.
11,954,199 B1 4/2024 Burns et al.
11,960,514 B1 4/2024 Taylert et al.
11,962,546 B1 4/2024 Hattangady et al.
11,971,914 B1 4/2024 Watson et al.
11,972,333 B1 4/2024 Horesh et al.
11,997,059 B1 5/2024 Su et al.
12,105,844 B1 10/2024 Burns et al.
12,107,885 B1 10/2024 Kawasaki et al.
12,111,926 B1 10/2024 Beveridge et al.
12,124,592 B1 10/2024 O'Hern et al.
12,130,917 B1 10/2024 Yeung et al.
12,130,943 B1 10/2024 Burns et al.
12,137,118 B1 11/2024 Kawasaki et al.
12,174,954 B1 12/2024 Yeung et al.
12,182,264 B2 12/2024 Sinha et al.
12,197,859 B1 1/2025 Malviya et al.
12,204,323 B1 1/2025 Malviya et al.
12,229,265 B1 2/2025 Yeung et al.
12,248,883 B1 3/2025 Rideout et al.
12,293,277 B1 5/2025 Yeung et al.
2010/0082811 A1 4/2010 Van Der Merwe
2014/0033307 A1 1/2014 Schmidtler
2014/0157415 A1 6/2014 Abercrombie et al.
2015/0074392 A1 3/2015 Boivie et al.
2016/0344770 A1 11/2016 Verma et al.
2017/0154021 A1 6/2017 Vidhani et al.
2017/0251006 A1 8/2017 LaRosa et al.
2017/0331841 A1 11/2017 Hu et al.
2018/0018590 A1 1/2018 Szeto et al.
2018/0063190 A1 3/2018 Wright et al.
2018/0205734 A1 7/2018 Wing et al.
2018/0219888 A1 8/2018 Apostolopoulos
2018/0324193 A1 11/2018 Ronen et al.
2019/0050564 A1 2/2019 Pogorelik et al.
2019/0238568 A1 8/2019 Goswami et al.
2019/0238572 A1 8/2019 Manadhata et al.
2019/0260784 A1 8/2019 Stockdale et al.
2019/0311118 A1 10/2019 Grafi et al.
2019/0392176 A1 12/2019 Taron et al.
2020/0019721 A1 1/2020 Shanmugam et al.
2020/0076771 A1 3/2020 Maier et al.
2020/0092299 A1 3/2020 Srinivasan et al.
2020/0175094 A1 6/2020 Palmer et al.
2020/0219009 A1 7/2020 Dao et al.
2020/0233979 A1 7/2020 Maraghoosh et al.
2020/0279192 A1 9/2020 Godfrey et al.
2020/0285737 A1 9/2020 Kraus et al.
2020/0313849 A1 10/2020 Kar et al.
2020/0364333 A1 11/2020 Derks et al.
2020/0403826 A1 12/2020 Dawani et al.
2020/0409323 A1 12/2020 Spalt et al.
2021/0110062 A1 4/2021 Oliner et al.
2021/0141897 A1 5/2021 Seifert et al.
2021/0209464 A1 7/2021 Bala et al.
2021/0218673 A1 7/2021 Ma et al.
2021/0224425 A1 7/2021 Nasr-Azadani et al.
2021/0303695 A1 9/2021 Grosse et al.
2021/0319098 A1 10/2021 Pogorelik et al.
2021/0319784 A1 10/2021 Le Roux et al.
2021/0357508 A1 11/2021 Elovici et al.
2021/0374247 A1 12/2021 Sultana et al.
2021/0407051 A1 12/2021 Pardeshi et al.
2022/0004929 A1* 1/2022 Sanketi .................... G06N 5/04
2022/0030009 A1 1/2022 Hasan
2022/0058444 A1 2/2022 Olabiyi et al.
2022/0070195 A1 3/2022 Sern et al.
2022/0083658 A1 3/2022 Shah et al.
2022/0114399 A1 4/2022 Castiglione et al.
2022/0147597 A1 5/2022 Bhide et al.
2022/0164444 A1 5/2022 Prudkovskij et al.
2022/0166795 A1 5/2022 Simioni et al.
2022/0182410 A1 6/2022 Tupsamudre et al.
2022/0253464 A1 8/2022 Sloane et al.
2022/0269796 A1 8/2022 Chase et al.
2022/0284283 A1 9/2022 Yin et al.
2022/0309179 A1 9/2022 Payne et al.
2023/0008037 A1 1/2023 Venugopal et al.
2023/0027149 A1 1/2023 Kuan et al.
2023/0049479 A1 2/2023 Mozo Velasco et al.
2023/0109426 A1 4/2023 Hashimoto et al.
2023/0111744 A1 4/2023 Chandrasekaran et al.
2023/0128947 A1 4/2023 Bhaskar et al.
2023/0148116 A1 5/2023 Stokes et al.
2023/0169397 A1 6/2023 Smith et al.
2023/0185912 A1 6/2023 Sinn et al.
2023/0185915 A1 6/2023 Rao et al.
2023/0208869 A1 6/2023 Bisht et al.
2023/0229960 A1 7/2023 Zhu et al.
2023/0252178 A1 8/2023 Ruelke et al.
2023/0259787 A1 8/2023 David et al.
2023/0269263 A1 8/2023 Yarabolu
2023/0274003 A1 8/2023 Liu et al.
2023/0289604 A1 9/2023 Chan et al.
2023/0351143 A1 11/2023 Kutt et al.
2023/0359903 A1 11/2023 Cefalu et al.
2023/0359924 A1 11/2023 Maman et al.
2023/0385085 A1 11/2023 Singh
2023/0388324 A1 11/2023 Thompson
2024/0005690 A1 1/2024 Brodie et al.
2024/0007469 A1 1/2024 Wang et al.
2024/0022585 A1 1/2024 Burns et al.
2024/0031026 A1 1/2024 Fujisawa et al.
2024/0039948 A1 2/2024 Koc et al.
2024/0045959 A1 2/2024 Marson et al.
2024/0054233 A1 2/2024 Ohayon et al.
2024/0078337 A1 3/2024 Kamyshenko et al.
2024/0080333 A1 3/2024 Burns et al.
2024/0126611 A1 4/2024 Phanishayee et al.
2024/0127065 A1 4/2024 Ren et al.
2024/0160902 A1 5/2024 Padgett et al.
2024/0289628 A1 8/2024 Parmar et al.
2024/0289863 A1 8/2024 Smith Lewis et al.
2024/0296315 A1 9/2024 Singh et al.
2024/0386103 A1 11/2024 Clement et al.
2024/0414177 A1 12/2024 Lal et al.
2024/0427986 A1 12/2024 Shakarian et al.
2025/0086455 A1 3/2025 Yang et al.

OTHER PUBLICATIONS

Dinan et al., 2021, "Anticipating safety issues in e2e conversational ai: Framework and tooling," ar Xiv preprint arXiv:2107.03451v3 (43 pages).

Wang et al., 2023, "Self-Deception: Reverse Penetrating the Semantic Firewall of Large Language Models," arXiv:2308.11521v1 [cs. CL] Aug. 16, 2023 (15 pages).

Shayegani et al., 2023, "Survey of Vulnerabilities in Large Language Models Revealed by Adversarial Attacks," arXiv:2310. 10844v1 [cs.CL ] Oct. 16, 2023 (54 pages).

(56) References Cited

OTHER PUBLICATIONS

Bezymiannyi et al., 2023, "Filter for confidential information," Electronics and Control Systems 4(78):21-25 (5 pages).
Wang et al., 2023, "Self-Guard: Empower the LLM to Safeguard Itself," ACL Anthology, NAACL (21 pages).
Sun et al., "CONSCENDI: A Contrastive and Scenario-Guided Distillation Approach to Guardrail Models for Virtual Assistants," arXiv:2304.14364v1 [cs.CL] Apr. 27, 2023 (20 pages).
Hu et al., "Gradient Cuff: Detecting Jailbreak Attacks on Large Language Models by Exploring Refusal Loss Landscapes," arXiv:2403.00867v1 [cs.CR] Mar. 1, 2024 (19 pages).
Robey et al., "SmoothLLM: Defending Large Language Models Against Jailbreaking Attacks," arXiv:2310.03684v3 [cs.LG] Nov. 29, 2023 (42 pages).
Mohtashami et al., "Social Learning: Towards Collaborative Learning with Large Language Models," arXiv:2312.11441v2 [cs.LG] Feb. 8, 2024 (19 pages).
Morozov et al., 2019, "Unsupervised Neural Quantization for Compressed-Domain Similarity Search," International Conference on Computer Vision (ICCV) 2019 (11 pages).
Rijthoven et al., 2021, "HookNet: Multi-resolution convulational neural networks for semantic segmentation in histopathology whole-slide images," Medical Imange Analysis 68:1-10.

* cited by examiner

800

MACHINE LEARNING MODEL ADVERSARIAL ATTACK MONITORING

RELATED APPLICATION

The current application claims priority to U.S. patent application Ser. No. 18/441,918 filed on Feb. 14, 2024 which, in turn, claims priority to U.S. Pat. App. Ser. No. 63/453,405, filed on Mar. 20, 2023, the contents of both of which are hereby fully incorporated by reference.

BACKGROUND

Machine learning models are increasingly being utilized across various applications, services, and computing systems. With the increased presence of machine learning model resources, so have the attacks perpetrated on machine learning-based systems by bad actors. Conventional methods of virus detection do not detect attacks made against most machine learning systems, such as attacks that attempt to control or otherwise manipulate the output of a machine learning model.

SUMMARY

The current subject matter is directed to detecting manipulation of a machine learning system by manipulating sample or input data to create a series of low confidence outputs. Detecting and preventing the atypical series of low confidence outputs prevents a perpetrator from determining how to generate a false prediction with low confidence without detection from typical system input and output fraud detection mechanisms.

Data fed into and output by a machine learning model is collected by a sensor. The data fed into the model includes vectorization data, which is generated from raw data provided from a requester, such as for example a stream of timeseries data. The output data can include a prediction or other output generated by the machine learning model in response to receiving the vectorization data.

The machine learning model output data is processed to determine whether the machine learning model is being subject to a malicious act (e.g., attack). Typically, the output of a machine learning model will vary in response to receiving vectorized input. If the output for a set of prediction data does not vary more than a particular distance, an alert can be generated. The distance can be set as a parameter for a particular machine learning system, a particular set of vectorization data, or otherwise set. The distance can be based on historical data, a static value such as five percent or ten percent, or manually set by an administrator.

In some variations, the present technology provides a method for monitoring a machine learning-based system output. The method begins by receiving vectorization data by a sensor on a server, wherein the vectorization data is derived from input data intended for a first machine learning model and provided by a requestor. Next, an output is received by the sensor. The output is generated by the machine learning model, wherein the machine learning model generates the output in response to receiving the vectorization data. Next, the method continues by transmitting the vectorization data and the output to a processing engine by the sensor. The processing engine then detects that the output values are within a subset of a first range, wherein each of a maximum value and a minimum value of the first range associated with a high confidence, each of a maximum and a minimum within the subset having a low confidence.

A response can then be applied to a request associated with the requestor, wherein the response is based at least in part on the detection.

In some variations, a non-transitory computer readable storage medium includes embodied thereon a program, the program being executable by a processor to perform a method for monitoring a machine learning-based system output. The method begins by receiving vectorization data by a sensor on a server, wherein the vectorization data is derived from input data intended for a first machine learning model and provided by a requestor. Next, an output is received by the sensor. The output is generated by the machine learning model, wherein the machine learning model generates the output in response to receiving the vectorization data. Next, the method continues by transmitting the vectorization data and the output to a processing engine by the sensor. The processing engine then detects that the output values are within a subset of a first range, wherein each of a maximum value and a minimum value of the first range associated with a high confidence, each of a maximum and a minimum within the subset having a low confidence. A response can then be applied to a request associated with the requestor, wherein the response is based at least in part on the detection.

In some variations, a system for monitoring a machine learning-based system output includes a server having a memory and a processor. One or more modules can be stored in the memory and executed by the processor to receive vectorization data by a sensor on a server, the vectorization data derived from input data intended for a first machine learning model and provided by a requestor, receive, by the sensor, an output generated by the machine learning model, the machine learning model generating the output in response to receiving the vectorization data, transmit the vectorization data and the output to a processing engine by the sensor, detect by the processing engine that the output values are within a subset of a first range, each of a maximum value and a minimum value of the first range associated with a high confidence, each of a maximum and a minimum within the subset having a low confidence, and apply a response to a request associated with the requestor, the response based at least in part on the detection.

In some variations, adversarial attacks on a machine learning model are detected by receiving vectorized data input into the machine learning model along with outputs of the machine learning model responsive to the vectorized data. The vectorized data corresponds to a plurality of queries of the machine learning model by a requesting user. A confidence level is determined which characterizes a likelihood of the vectorized data being part of a malicious act directed to the machine learning model by the requesting user. Data providing the determined confidence levels can be provided to a consuming application or process.

The outputs of the machine learning model can correspond to a predefined number of queries of the machine learning model. In other variations, the outputs of the machine learning model can correspond to a predefined time window.

A sensor forming part of a customer computing environment can intercept or otherwise access the vectorized data and the outputs of the machine learning model. The sensor can transmit the vectorized data and the outputs of the machine learning model over a computing network.

The confidence level is determined by detecting that output values within a particular window falls within a respective maximum value and a minimum value range corresponding to either a high confidence level or low confidence level.

The consuming application or process can generate an alert based on one or more determined confidence levels when the confidence level is at or below a pre-determined value.

The consuming application or process can generate and send a pattern of false output values to the requesting user when the confidence level is at or below a predetermined value.

The consuming application or process can cause a pattern of false output values to be sent to the requesting user when the confidence level is at or below a predetermined value.

The consuming application or process can generate and send a pattern of a randomized response to the requesting user when the confidence level is at or below a predetermined value.

The consuming application or process can generate and send a honeypot response to divert the requesting user away from the machine learning model when subsequent requests are received when the confidence level is at or below a predetermined value.

The consuming application or process can disconnect or block the requester from the machine learning model when the confidence level is at or below a predetermined value.

The data can be provided to the consuming application or process only when the determined confidence levels are at or below a pre-determined value (i.e., no indication is sent when the confidence level is above such value to reduce the consumption of computing resources, etc.).

The consuming application or process can be a user interface console and/or an application programming interface (API) endpoint.

In some variations, adversarial attacks on machine learning models being executed in plurality of customer environments can be detected. A respective sensor executing within each of the plurality of customer environments can detect vectorized data being input into a corresponding monitored machine learning model and responsive outputs of such monitored machine learning model. The vectorized data detected by each sensor can correspond to a plurality of queries of the corresponding monitored machine learning model. A central system environment receives the vectorized data and the responsive outputs from the monitored machine learning models from each of the sensors. The central system environment, on a sensor-by-sensor basis and by a processing engine, determines a confidence level characterizing a likelihood of the vectorized data being part of a malicious act directed to the corresponding machine learning. Data characterizing the determined confidence levels can be provided to a consuming application or process.

DETAILED DESCRIPTION

Figure 1:
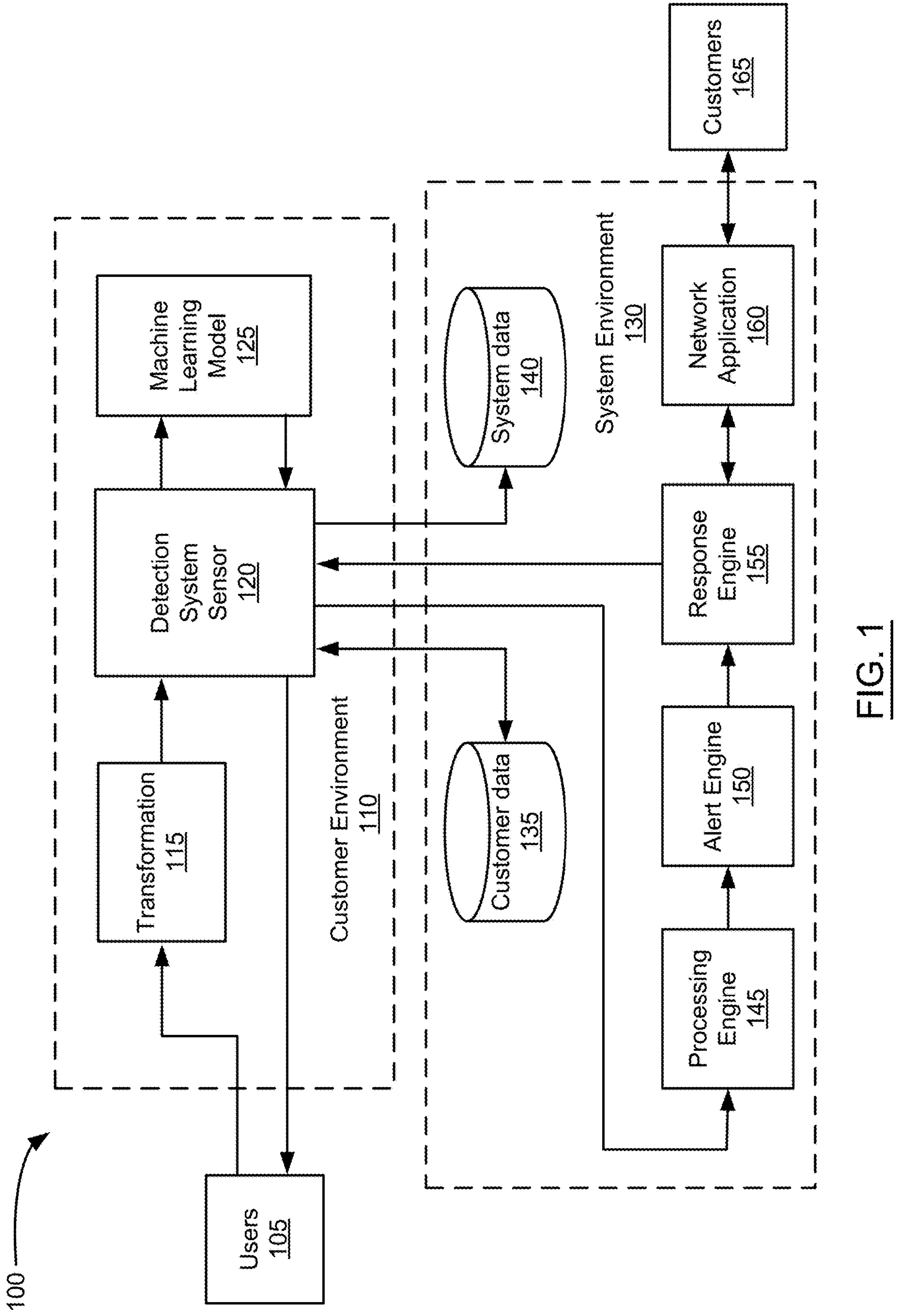
FIG. 1 is a block diagram of a system for monitoring and detecting malicious model output manipulation.

The current subject matter is directed to techniques for detecting manipulation of a machine learning system (e.g., a system incorporating or otherwise directly or indirectly using at least one machine learning model as part of a computer-implemented workflow or other process) by providing sample or input data to intentionally create, for example, a series of low confidence outputs from one or more machine learning models. Detecting and preventing the atypical series of low confidence outputs prevents a perpetrator from determining how to generate a false prediction with low confidence without detection from typical system input and output fraud detection mechanisms.

Data fed into and output by a machine learning model is collected by a sensor. The sensor can be a software-implemented module or process to extract features from various data sources (sometimes referred to as raw data). The data fed into the machine learning model includes vectorization data, which is generated from the features extracted from raw data provided from a requester, such as for example a stream of timeseries data. Stated differently, features extracted from the various data sources can be arranged in a vector for consumption by one or more machine learning models. The output of the machine learning model can be a prediction, classification or other output generated by the machine learning model in response to receiving the vectorization data.

The machine learning model output data can be processed to determine whether the machine learning model is being subject to a malicious act (e.g., attack). Typically, the output of a machine learning model will vary in response to receiving vectorized data as an input. If the output for a set of prediction data does not vary more than a particular distance, an alert can be generated. With a series of model outputs, the min and max value can be found and used to create a delta of prediction over time (e.g., max: 0.9, min: 0.2, delta: 0.9−0.2). If the given delta over time is within one or more specific ranges, it can be indicative of adversarial abuse. The distance can be set as a parameter for a particular machine learning system or model, a particular set of vectorization data, or otherwise set. The distance can be based on historical data, a static value such as five percent or ten percent, or manually set by an administrator.

The current subject matter can detect when a bad actor is attempting to change the output (e.g., the prediction, classification, etc.) for a machine learning model. The bad actor can make small adjustments to the input of a machine learning model to achieve small changes in the model's output. Typically, the input to a machine learning model will vary, and the resulting output will vary as well. For example, for an output range of 1.0 as very confident yes to −1.0 as very confident no, the typical output will vary between the entire range. The current subject matter can detect when the output includes multiple consecutive prediction values that range between a much smaller range, for example 0.2 (a low confidence yes) to −0.2 (a low confidence no). In this example, the range is not typical, and indicates the input is likely being manipulated by a bad actor to affect or control the output value and confidence of a machine learning model. The range can be calculated, for example, over a specified time period and/or by a number of model queries (i.e., inputs to the model).

FIG. 1 is a block diagram of a system for monitoring and detecting malicious model output manipulation. The system of FIG. 1 includes users 105, customer environment 110, system environment 130, and customers 160. Customer environment includes a transformation module 115 and machine learning model 125. In between the transformation module and machine learning model is a detection system sensor 120. Each of the customer environment 110 and the system environment comprises one or more computing devices (e.g., edge computers, servers, etc.). The various modules can be wholly software or a hybrid of software/hardware depending on the desired implementation.

One or more users (i.e. client computing devices, servers, etc.) can provide a stream of data, such as a timeseries data, generalized input, or some other data type, to transformation module 115. The transformation module can convert the received timeseries into a series of vectorized data. In some variations, the vectorized data can include an array of float numbers. The vectorization of the received data is then provided to machine learning model 125 for processing. After processing the vectorized data, machine learning model will provide an output, such as a value characterizing a prediction or classification to be provided to the requesting user 105 or another consuming application or process.

Detection system sensor 120 can collect the vectorized data provided by transformation module 115 and as well as the output provided by machine learning model 125. The detection system sensor 120 can then couple the vectorized data (or an abstraction thereof) and model output, and transmit the coupled data to the processing engine 145 of system environment 130. Further, in some arrangements, the sensor 120 can forward the vectorization data received from transformation 115 to machine learning model 125 (while in other arrangements the transformation module 115 can directly interface with the machine learning model 125). Sensor 120 can also provide the output of model 125 or provide other data to the requesting user 105. For example, sensor 120 can generate and transmit a response to the requesting user based on data received from response engine 155. In some variations, sensor 120 can disconnect the requesting user based on response data received from response engine 155.

The detection system sensor 120 can be implemented in various ways. In some variations, a sensor can be implemented as an API placed between the requesting user 105 and the machine learning model 125. The API can intercept the request, and then send the request to the machine learning model 125 as well as to a publisher API. The publisher API can then transmit the vectorization data (or an abstraction thereof) to a processing engine 145. The publisher API can add data to a streaming queue for ultimate consumption by the processing engine 145. The processing engine 145 can then: (i) sequence the data by timestamp so that the distributed data is ordered, (ii) create subsets of timeseries data to run analyses, (iii) run analyses over groups to determine requester behavior of the model query, and (iv) classify the events of the groups benign or malicious using the output model monitoring prediction measurements. The sensor API can then receive the response generated by the customer's machine learning model 125, and forward the response to the requesting user 105, if no malicious act is detected, or generate a different response based on data received from the response engine 155.

In some variations, the detection system sensor 120 can be implemented by an API gateway as well as a proxy application. The API gateway can receive the request, provide the request to the proxy application, which can then forward the request to the machine learning model 125 as well as a publisher. The publisher can then forward the request to the system environment for processing by the processing engine 145. The machine learning model can provide a response to the proxy application, and the proxy application can also receive response data from response engine 155. The proxy application can then either forward the machine learning model response to the requesting user through the API gateway, if the user request is not associated with a malicious act, or can generate a response based on the response data received from the response engine 155 when the request is associated with the malicious act on the machine learning model.

Returning to FIG. 1, system environment 130 includes customer data store 135, system data store 140, processing engine 145, alert engine 150, response engine 155, network application 160, and customers 165. Each of customer environment 110 and system environment 130 can be implemented as one or more computing devices (e.g., servers, etc.) implementing the physical or logical modules 115-125 and 135-160 illustrated in FIG. 1. In some variations, aspects of each environment are located in one or more cloud computing environments.

Environments 110 and 130 can communicate over a network. In some variations, one or more modules can be implemented on separate machines in separate environments which can also communicate over a network. The network can be implemented by one or more networks suitable for communication between electronic devices, including but not limited to a local area network, wide-area networks, private networks, public network, wired network, a wireless network, a Wi-Fi network, an intranet, the Internet, a cellular network, and any combination of these networks.

The customer data store 135 of FIG. 1 stores or otherwise comprises data associated with one or more customers such as artefacts characterizing various processes and applications executing in the customer environment 110. The customer data store 135 can be directly or indirectly accessed by some or all of the modules 140-160 within system environment 130. More information for customer data 135 is discussed with respect to the system of FIG. 2.

System data store 140 stores or otherwise comprises data related to system environment 130. System data can include event data, traffic data, timestamp data, and other data. The other data can take various forms and characterize or include one or more of: metadata around model inferences, information of input layer including data type, shape, and hash, information of output layer including data type, shape, and hash, information of prediction such as label, vectors metrics, standard deviation, variance, 12_norm, min, max, number of 0s, and number of 1s, processing engine metadata such as prediction output min, max, and deltas, alert information, MITRE technique and tactic, attack category, and severity of attack. The data can be accessed by one or more of modules 145-160 and can be used to generate one or more dashboards for use by customers 165. The dashboards can be user interface views which can characterize various security aspects relating to the customer environment 110 including, for example, overall threat level, threat level on specific computing nodes, events of interest, current users, and the like. More details for system data store 140 are discussed with respect to FIG. 3.

Processing engine 145 can be implemented by one or more modules that receive and process coupled vectorization data and machine learning model output data. In some variations, processing engine 145 can process machine learning model output data to determine whether the distance between the maximum value and minimum values of a set of output data satisfy a threshold (as determined, for example, using one of the above-described distance techniques). The set of output data can be based on a number of queries and/or a time period. Satisfying the threshold can be include being more than a parameter distance or less than a parameter distance. The threshold can be modified to be more or less aggressive for detection. In any case, if the distance is less than the parameter value, the input data can be considered to be malicious and an alert can be triggered. The alert, can, for example, provide a notification to a user by email, messaging, and/or in a dashboard. The alert can in addition or alternatively cause one or more remedial measures to be taken with regard to the requesting user 105 and/or a group of computing devices associated with the requesting user 105.

In some variations processing the received coupled data can include, in addition to or alternative to the statistical measurements techniques describe above, applying one or more machine learning modeling techniques to the data to determine if a malicious act has been performed against the customer's machine learning model 125. The machine learning model techniques applied to the coupled data can include models trained using unsupervised learning or clustering, timeseries modeling, classification modeling, and other modeling techniques.

Alert engine 150 can generate an alert based on the comparison of the distance between the data maximum and minimum values and the threshold parameter. These alerts can be categorized such by severity: high, medium, low. In some variations, different alerts can be provided based on different threshold parameters that are (or are not) satisfied, with more urgent alerts generated for a small threshold.

Alert engine 150 can passes the coupled data from the processing engine and the triggered alert to response engine 155. Response engine 155 can receive the alert data and select a response to implement with respect to the requestor that transmitted the request from which the vectorization data was created. The responses can include anything such as providing a false series of prediction values having a pattern of some sort, providing a randomized response, implementing a honeypot response, or disconnecting the requester. These modified outputs essentially poison the output so that a requester is unable to learn how the model is making its decisions. Information about the selected response is provided to detection system sensor 120, which then generates and implements the response.

Response engine provides the selected response and the alert data to network application 160. Network application 160 can provide one or more APIs, integrations, or user interfaces, for example in the form of a dashboard, which can be accessed by customers 165. The dashboard can provide information regarding any detected or suspected malicious acts, attack trends, statistics and metrics, and other data.

Figure 2:
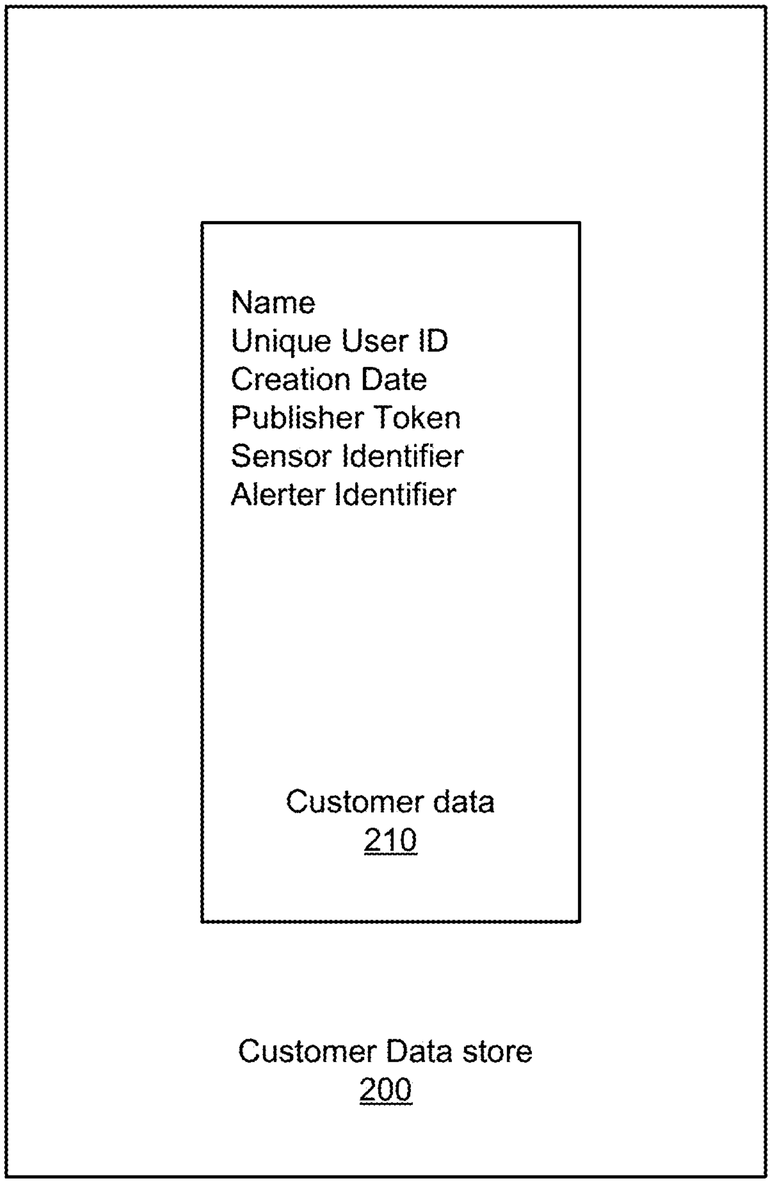
FIG. 2 is a block diagram of a customer data store.

FIG. 2 is a block diagram of a customer data store such as FIG. customer data store 135 of FIG. 1. Customer data store 135 can include customer data 210 relevant to their use of a particular machine learning model 125 in their respective customer environment 110. Customer data can include, but is not limited to, a customer name, a unique user ID, a date that the customer data was created, a publisher token, a sensor identifier, and/or a letter identifier. The sensor identifier can indicate which detection system sensor 120 is associated with the customer's machine learning model 125 that is being monitored by the present system. A letter identifier can include an identifier for a particular alert engine that provides alert regarding the particular user's machine learning model 125. Customer data store 135 can segregate data on a tenant-by-tenant basis (i.e., by customer, etc.).

Figure 3:
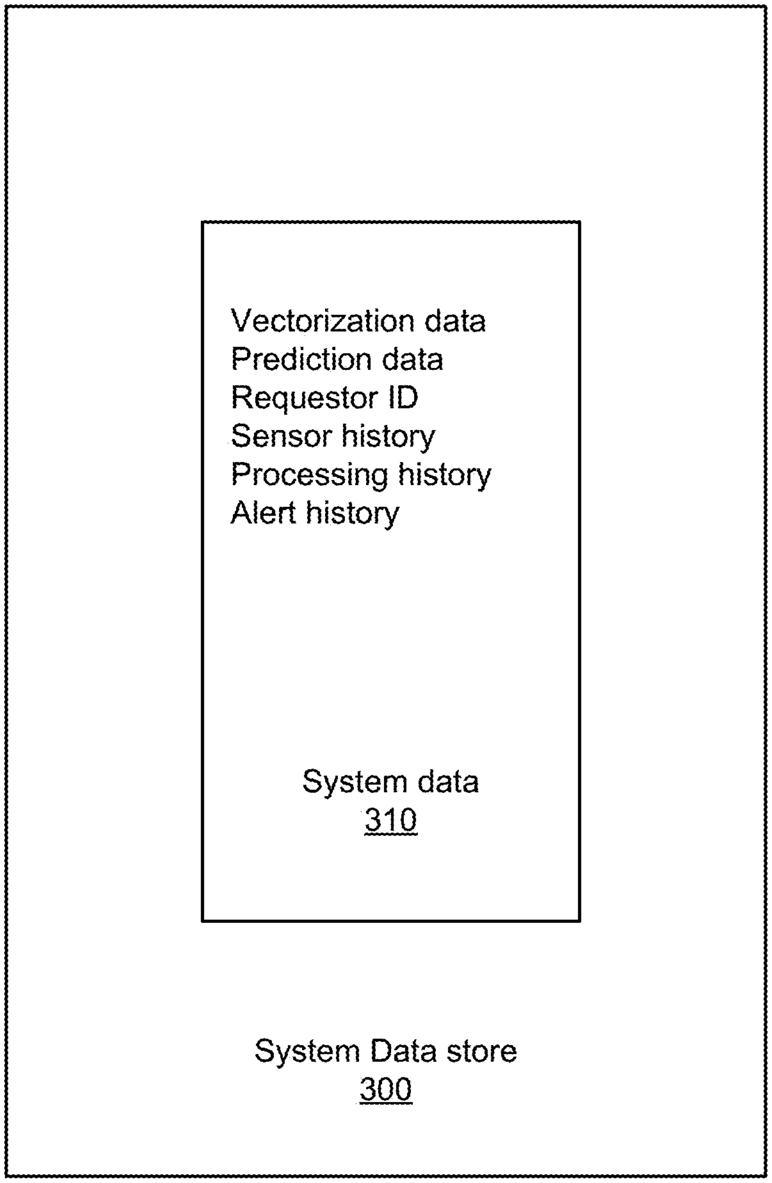
FIG. 3 is a block diagram of a system data store.

FIG. 3 is a block diagram of a system data store FIG. such as system data store 140 in the system of FIG. 1. System data store 300 can include system data 310 such as, for example, vectorization data, prediction data, requester ID, sensor history, processing history, and/or alert history. The vectorization data can include the data generated by transformation module 115 with a customer environment 110, for each customer. Prediction data can include the output of machine learning model 125 that is intercepted by sensor 120, for each customer. Requester ID can include the source of raw data, such as timeseries data, which is provided from the corresponding transformation module 115 executing in the corresponding customer environment 110. Sensor history includes a log of the actions performed by the corresponding detection system sensor 120, the platform on which sensors are implemented, and other data regarding each sensor. Processing history can include the history, such as log information, processing history, and other history for processing engine 145 for each particular customer. Alert history includes data such as the events occurring from alert engine 150, the status of alert engine 150, and the alerts generated by alert engine 150 for each particular customer.

Figure 4:
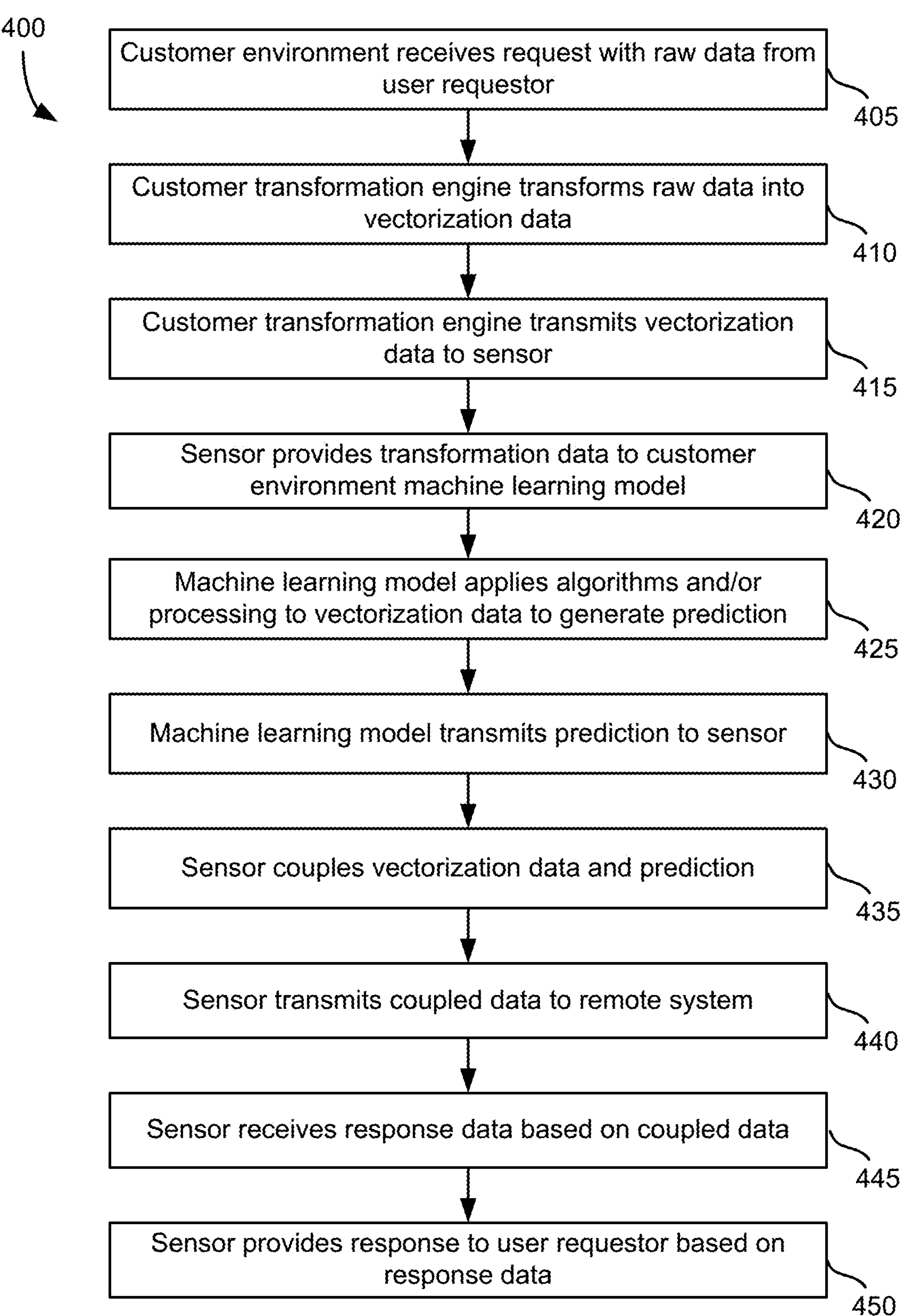
FIG. 4 is a method for intercepting vectorization data and a machine learning model prediction.

FIG. 4 is a method for intercepting vectorization data and a machine learning model prediction. First, a customer environment receives a request consisting of raw data from a requesting user 105 at step 405. The raw data can take various forms. For example, the raw data can be text, images, a stream of time series data, tabular data, or other data provided directly from a requester to the customer's environment 110 (which can also take different forms such as text, image, time series, tabular, etc.). Customer transformation engine 115 then transforms the raw data into vectorization data at step 410 by, for example, extracting features from the raw data and populating a vector. The vectorization data can be associated with a requester ID which, in turn, can be used to track the behavior of the particular user 105. In some implementations, the vectorization data is configured such that the identity of the requester (other than the requester ID) cannot be used to determine the true identity of the requesting user 105. In some variations, the vectorization data can be in the format of an array of float numbers.

The customer transformation engine 115 transmits the vectorization data to a detection system sensor 120 at step 420. The detection system sensor 120 can be placed between the transformation module 115 and the machine learning model 125 to collect, or in some cases intercept, vectorization data transmitted to machine learning model 125.

The detection system sensor 120 can be provided in a variety of formats. In some variations, the sensor 120 can be provided as an API to which vectorization data can be directed. In some variations, the sensor 120 can be implemented as a network traffic capture tool that captures traffic intended for the machine learning model. In some variations, the sensor can be implemented using cloud libraries, for example a Python or C library, which can be plugged into customer software and used to direct vectorization traffic to the processing engine 145.

Machine learning model 125 applies algorithms and/or processing to the vectorization data to generate a prediction at step 425. Machine learning model 125 is part of the customer environment 110 and processes the vectorization data that is transmitted by transformation module 115. In some variations, detection system sensor 120, after collecting and/or intercepting the vectorization data, can forward the vectorization data to machine learning model 125 to be processed. Machine learning model then transmits the output prediction to sensor 120 at step 430.

The detection system sensor 120 couples or otherwise combines or abstracts the vectorization data and prediction at step 435. The detection system sensor 120 then transmits the coupled data to the remote system environment 130 at step 440. At some point subsequently, the detection system sensor receives response data based on the coupled data at step 445. The response data can be an indication of what response to send the requesting user 105 generated by the system 130. In particular, the response data can indicate a response selected by response engine 155, other than the output, to be provided to the requesting user 105 based on a detection of a malicious act by the requester. The detection system sensor 120 can generate a response based on the response data to the user requester at step 450. The response can be a pattern of data other than the output generated by machine learning model 125, randomized data, a honeypot based response, or a termination or disconnect of the session with the requester.

Figure 5:
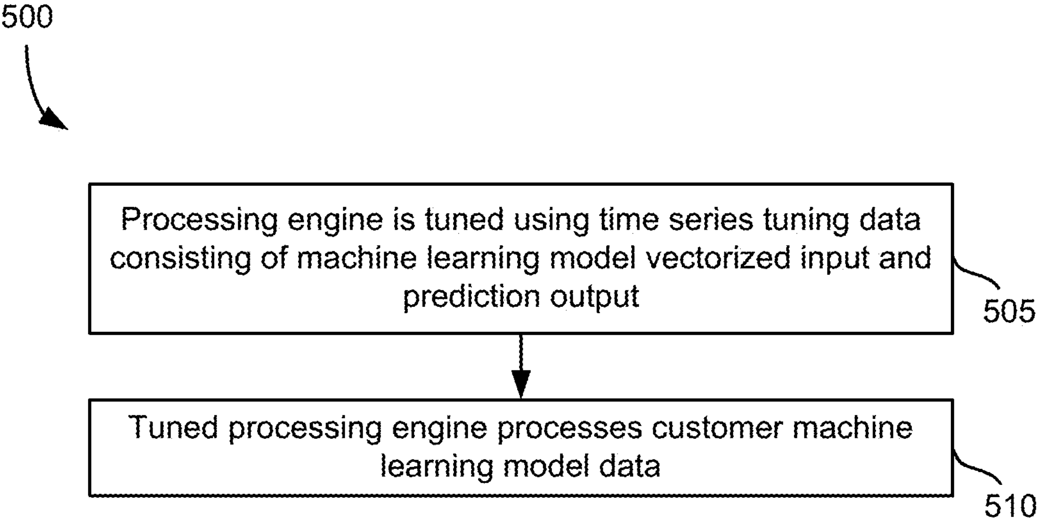
FIG. 5 is a method for tuning a processing engine.

FIG. 5 is a method for tuning a processing engine. The method 500 of FIG. 5 begins with tuning the processing engine using time series tuning data and output data at step 505. The time series tuning data can include machine learning model vectorized input data. The tuning can include determining the best value of a threshold parameter representing the maximum acceptable distance between a maximum value and a minimum value within a set of machine learning model output predictions. More detail for tuning a processing engine is discussed with respect to FIG. 6.

In some variations, the processing engine can include one or more machine learning models, which can be tuned by processing the output values. In some variations, the processing engine can include comparison logic that determines a suitable threshold parameter representing the maximum allowed distance between the output maximum and minimum for a set of output data. In some variations, determining a suitable threshold parameter can be achieved by determining the average range over a period of time and setting the threshold as percentage of the average range, such as 5%, 10% or some other percentage of the average range. In some variations, determining a suitable threshold parameter can be achieved by determining the minimum distance for data known to be malicious. In some variations, determining a suitable threshold parameter can be achieved by determining a baseline for the average output value over a set period of time and determining the threshold parameter as plus or minus 5%, 10% or some other percentage of the average value. In some variations, determining a suitable threshold parameter can be achieved by having an administrator set the threshold parameter based on review of a set of output values.

Once the processing engine is tuned, the tuned processing engine processes customer machine learning model data at step 510. More details for processing customer machine learning model data is discussed with respect to the method of FIG. 6.

Figure 6:
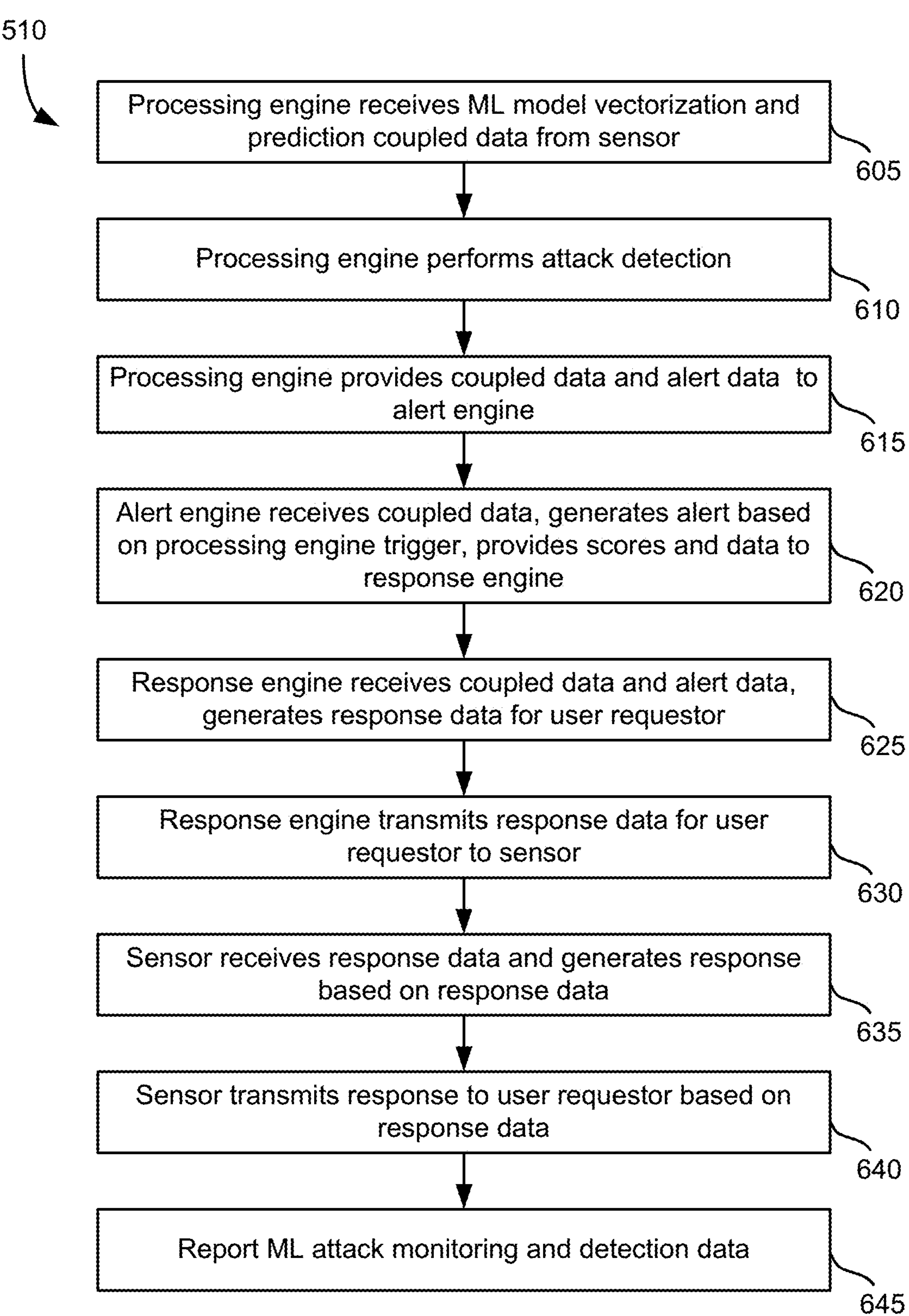
FIG. 6 is a method for monitoring and detecting malicious model output manipulation.

FIG. 6 is a method for monitoring and detecting malicious model output manipulation. First, a processing engine 145 receives the machine learning model vectorization and prediction coupled data from the detection system sensor 120 at step 605. The processing engine 145 then performs attack detection at step 610. Performing attack detection can include determining if a tuned processing engine 145 detects that the distance between a minimum and maximum output satisfies (e.g., is greater than) a threshold parameter. More details for performing attack detection by a processing engine 145 are discussed with respect to the method of FIG. 7.

The processing engine 145 provides the coupled data and the alert data to an alert engine 150 at step 615. In some variations, the alert engine 150 of FIG. 1 can have several instances, with one instance per customer. The alert engine 150 receives the coupled data and alert data, generates an alert as needed based on the received data, and provides the coupled data, alert data, and alert to a response engine 155 at step 625. More details for generating an alert is discussed with respect to the method of FIG. 7.

The response engine 155 receives the coupled data and the alert data and generates response data for the user requester at step 630. The response data can include a selected response to apply to the requester based on the alert data. For example, if the alert data was generated for a difference that was within 5% then a response other than the output generated by machine learning model 125 can be provided to the requesting user 105 that provided the raw data to transformation module 115. The selected response can be based on various factors including the user request, the category of the malicious act, the time or date of the response, the history of attacks from the particular requestor, and/or other contextual data. The response engine 155 transmits the response data for the requesting user 105 to the detection system sensor 120 at step 635. The detection system sensor 120 receives the response data and generates a response based on the response data at step 640. The detection system sensor 120 executes the response, which in some cases can include transmitting a response to the requesting user 105, based on the received response data at step 645. The status of any attack on the machine learning model owned by the customer can be reported (e.g., reported to an agent associated with the customer as opposed to the requesting user 105) at step 650. The reporting can include details, including raw data, metrics, current status, regarding the monitoring and detection data for the machine learning model 125.

Figure 7:
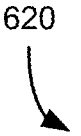
FIG. 7 is a method for generating an alert.
Figure 7:
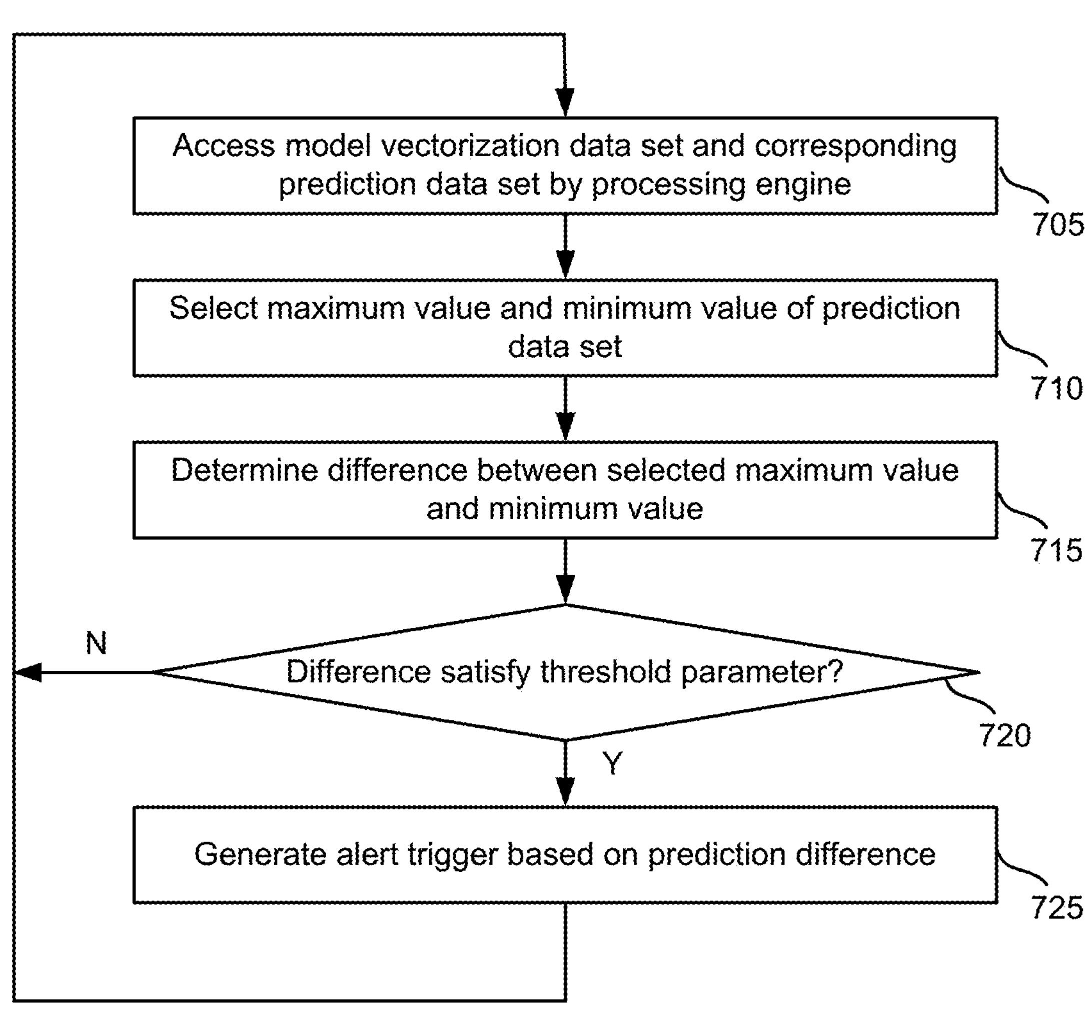

FIG. 7 is a method for generating an alert. The method of FIG. 7 provides more detail for step 620 FIG. of the method of FIG. 6. Alert engine 150 accesses coupled vectorization data and prediction data from processing engine 145 at step 605. A maximum value and minimum value of the accessed prediction data are selected at step 710. In some variations, the accessed prediction data is processed to identify the prediction data point having the highest value and the prediction data point having the lowest value. The difference between the selected maximum value and minimum value is then determined at step 715.

A determination is made as to whether the difference satisfies a threshold parameter at step 720. In some variations, the threshold parameter is determined during a tuning process, such as that discussed with respect to step 505 of FIG. 5. In some variations, if the difference between the maximum prediction value and the minimum value satisfies (e.g., is less than) the threshold parameter distance, an alert trigger can be generated at step 725 based on the prediction difference.

For example, if the threshold parameter was 0.4, the maximum prediction value was 0.1 and the minimum prediction value was −0.2, the distance between the values (0.3) would satisfy the threshold parameter of 0.4. In some variations, the maximum value and minimum value are taken from a set number of consecutive prediction values, such as 10 or 20 prediction values. In some variations, the maximum value and minimum value are taken from a prediction value data set received over a set period of time, such as 5 minutes, 10 minutes, 1 hour, or 1 day. In some variations, the determination involves determining whether a minimum number or percentage of prediction data points are within the threshold parameter distance, such as 80%, 90%, or 100% of prediction data points being within the threshold parameter distance over a set period of time.

The alert trigger generated at step 725 can have different levels of urgency or warning based on the percentage of data points within the maximum and minimum prediction values. For example, if 50% of the prediction values are between the maximum and minimum points and within the threshold parameter, a low level alert can be generated. If 70% of the prediction values are between the maximum and minimum points and within the threshold parameter, a medium level alert can be generated. If 90% or more of the prediction values are between the maximum and minimum points and within the threshold parameter, a high level alert can be generated. After an alert is triggered at step 725, or it is determined that the difference does not satisfy the threshold parameter, the method of FIG. 7 returns to step 705 to process additional data.

Figure 8:
FIG. 8 illustrates of a series of output prediction values for a machine learning machine.
Figure 8:
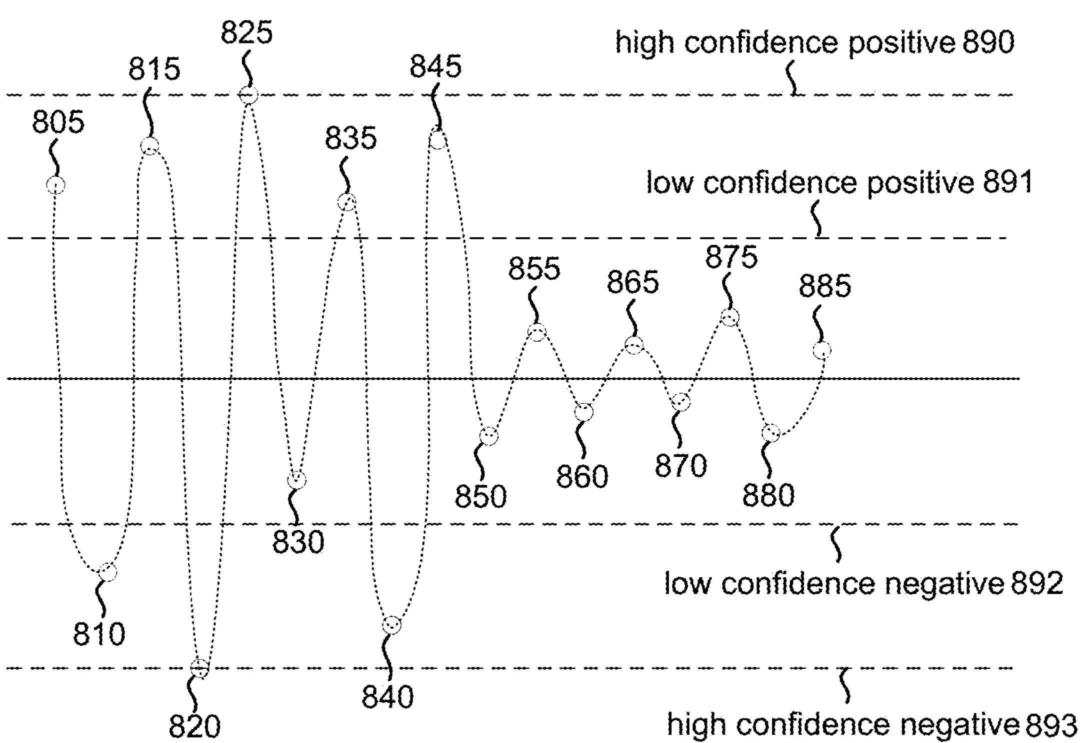

FIG. 8 illustrates of a series of output prediction values for a machine learning machine. Plot 800 includes prediction values 805-885. The prediction values extend between high confidence positive values 890, low confidence positive values 891, low confidence negative values 892, and high confidence negative values 893. The numeric values associated with each confidence and value marker 890-893 can vary based on design considerations. In some variations, high confidence positive 890 can have a maximum value of 1.0 and high confidence negative can have a maximum value of −1.0.

Prediction values 805-845 represent a normal distribution of prediction values. As shown, a typical string of prediction values will vary between a full range of high confidence positive and high confidence negative. As such, some of the prediction values will be positive and some prediction points will be negative, and some prediction points will be in a high confidence range and some prediction points will be in a low confidence range.

Prediction values 850-885 represent a suspicious or fraudulent distribution of prediction values. The prediction values 850-885 vary between a low confidence positive value 891 and a low confidence negative mark 892. Hence, prediction values 850-885 have a maximum and minimum value within the low confidence range between values 891 and 892. Unlike a typical range of prediction values, none of the prediction values 850-885 are located in a high confidence range. Rather, the prediction values 850-885 are within a subset (between low confidence positive value 891 and low confidence negative value 892) of the full possible range of prediction values (between high confidence positive value 890 and high confidence negative value 893).

In some variations, adversarial attacks on a machine learning model are detected by receiving vectorized data input into the machine learning model along with outputs of the machine learning model responsive to the vectorized data. The vectorized data corresponds to a plurality of queries of the machine learning model by a requesting user. A confidence level is determined which characterizes a likelihood of the vectorized data being part of a malicious act directed to the machine learning model by the requesting user. Data providing the determined confidence levels can be provided to a consuming application or process.

The outputs of the machine learning model can correspond to a predefined number of queries of the machine learning model. In other variations, the outputs of the machine learning model can correspond to a predefined time window.

A sensor forming part of a customer computing environment can intercept or otherwise access the vectorized data and the outputs of the machine learning model. The sensor can transmit the vectorized data and the outputs of the machine learning model over a computing network.

The confidence level is determined by detecting that output values within a particular window falls within a respective maximum value and a minimum value range corresponding to either a high confidence level or low confidence level.

The consuming application or process can utilized the confidence levels in various manners. For example, the consuming application or process can generate an alert based on one or more determined confidence levels when the confidence level is at or below a pre-determined value. The consuming application or process can generate and send a pattern of false output values to the requesting user when the confidence level is at or below a predetermined value. The consuming application or process can cause a pattern of false output values to be sent to the requesting user when the confidence level is at or below a predetermined value. The consuming application or process can generate and send a pattern of a randomized response to the requesting user when the confidence level is at or below a predetermined value. The consuming application or process can generate and send a honeypot response to divert the requesting user away from the machine learning model when subsequent requests are received when the confidence level is at or below a predetermined value. The consuming application or process can disconnect or block the requester from the machine learning model when the confidence level is at or below a predetermined value.

The data can be provided to the consuming application or process only when the determined confidence levels are at or below a pre-determined value (i.e., no indication is sent when the confidence level is above such value to reduce the consumption of computing resources, etc.).

The consuming application or process can be a user interface console and/or an application programming interface (API) endpoint.

In some variations, adversarial attacks on machine learning models being executed in plurality of customer environments can be detected. Stated differently, the current subject matter can be directed to an arrangement in which there are a plurality of tenants (e.g., from different organizations, etc.) executing machine learning models which are monitored by a central system environment. A respective sensor executing within each of the plurality of customer environments can detect vectorized data being input into a corresponding monitored machine learning model and responsive outputs of such monitored machine learning model. The vectorized data detected by each sensor can correspond to a plurality of queries of the corresponding monitored machine learning model. The central system environment receives the vectorized data and the responsive outputs from the monitored machine learning models from each of the sensors. The central system environment, on a sensor-by-sensor basis and by a processing engine, determines a confidence level characterizing a likelihood of the vectorized data being part of a malicious act directed to the corresponding machine learning. Data characterizing the determined confidence levels can be provided to a consuming application or process.

Figure 9:
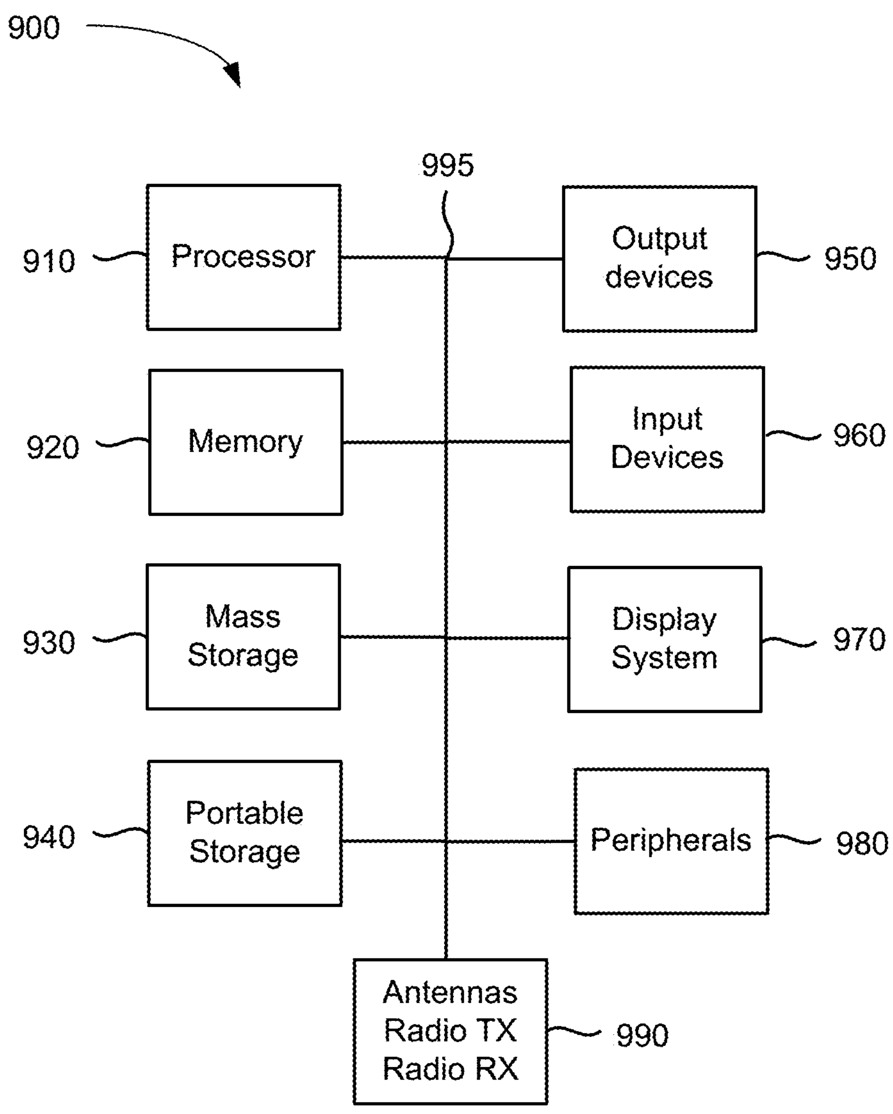
FIG. 9 is a block diagram of a computing environment for implementing aspects of the current subject matter.

FIG. 9 is a block diagram of a computing environment for implementing aspects of the current subject matter. System 900 of FIG. 9 can be implemented in the contexts of the likes of machines that implement detection system sensory 120, data stores 135 and 140, processing engine 145, alert engine 150, response engine 155, and network application 160. The computing system 900 of FIG. 9 includes one or more processors 910 and memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components can be connected through one or more data transport means. For example, processor unit 910 and main memory 920 can be connected via a local microprocessor bus, and the mass storage device 930, peripheral device(s) 980, portable storage device 940, and display system 970 can be connected via one or more input/output (I/O) buses.

Mass storage device 930, which can be implemented with a magnetic disk drive, an optical disk drive, a flash drive, or other device, is a non-volatile storage device for storing data and instructions for use by processor unit 910. Mass storage device 930 can store the system software for implementing aspects of the current subject matter for purposes of loading that software into main memory 920.

Portable storage device 940 operates in conjunction with a portable non-volatile storage medium, such as a floppy disk, compact disk or Digital video disc, USB drive, memory card or stick, or other portable or removable memory, to input and output data and code to and from the computer system 900 of FIG. 9. The system software for implementing aspects of the current subject matter ention can be stored on such a portable medium and input to the computer system 900 via the portable storage device 940.

Input devices 960 provide a portion of a user interface. Input devices 960 can include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 900 as shown in FIG. 9 includes output devices 950. Examples of suitable output devices include speakers, printers, network interfaces, and monitors.

Display system 970 can include a liquid crystal display (LCD) or other suitable display device. Display system 970 receives textual and graphical information and processes the information for output to the display device. Display system 970 can also receive input as a touch-screen.

Peripherals 980 can include any type of computer support device to add additional functionality to the computer system. For example, peripheral device(s) 980 can include a modem or a router, printer, and other device.

The system of 900 can also include, in some implementations, antennas, radio transmitters and radio receivers 990. The antennas and radios can be implemented in devices such as smart phones, tablets, and other devices that can communicate wirelessly. The one or more antennas can operate at one or more radio frequencies suitable to send and receive data over cellular networks, Wi-Fi networks, commercial device networks such as a Bluetooth device, and other radio frequency networks. The devices can include one or more radio transmitters and receivers for processing signals sent and received using the antennas.

The components contained in the computer system 900 of FIG. 9 are those typically found in computer systems that can be suitable for use with aspects of the current subject matter and are intended to represent a broad category of such computer components that are well known in the art. Thus, the computer system 900 of FIG. 9 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The invention claimed is:

1. A method for detecting adversarial attacks on machine learning models being executed in a plurality of customer environments, the method comprising:

detecting, by a respective sensor executing within each of the plurality of customer environments, vectorized data being input into a corresponding monitored machine learning model and responsive outputs of such monitored machine learning model, the vectorized data detected by each sensor corresponding to a plurality of queries by a requesting user of the corresponding monitored machine learning model, each sensor being implemented as an application programming interface positioned between the requesting user and the corresponding monitored machine learning model, the application programming interface forwarding a request from the requesting user to the corresponding monitored machine learning model and to a publisher that adds data to a streaming queue for consumption by a processing engine;

receiving, by a central system multi-tenant environment, the vectorized data and the responsive outputs from the monitored machine learning models from each of the sensors;

determining, on a sensor-by-sensor basis by the processing engine forming part of the central system environment, a confidence level characterizing a likelihood of the vectorized data being part of a malicious act directed to the corresponding machine learning model; and providing data characterizing the determined confidence levels to a consuming application or process.

2. The method of claim 1, wherein the responsive outputs of the corresponding monitored machine learning model correspond to a predefined number of queries of such corresponding monitored machine learning model.

3. The method of claim 2, wherein the responsive outputs of the corresponding monitored machine learning model correspond to a predefined time window.

4. The method of claim 1, wherein the confidence level is determined by detecting that the responsive outputs within a particular window fall within a respective maximum value and a minimum value range corresponding to either a high confidence level or a low confidence level.

5. The method of claim 1, wherein the consuming application or process generates an alert based on one or more determined confidence levels when the confidence level is at or below a pre-determined value.

6. The method of claim 1, wherein the consuming application or process generates and sends a pattern of false output values to the requesting user when the confidence level is at or below a predetermined value.

7. The method of claim 1, wherein the consuming application or process causes a pattern of false output values to be sent to the requesting user when the confidence level is at or below a predetermined value.

8. The method of claim 1, wherein the consuming application or process generates and sends a pattern of a randomized response to the requesting user when the confidence level is at or below a predetermined value.

9. The method of claim 1, wherein the consuming application or process generates and sends a honeypot response to divert the requesting user away from the corresponding monitored machine learning model when subsequent requests are received when the confidence level is at or below a predetermined value.

10. The method of claim 1, wherein the consuming application or process, when the confidence level is at or below a predetermined value, disconnects or blocks the requesting user from the corresponding monitored machine learning model.

11. The method of claim 1, wherein data is provided to the consuming application or process only when the determined confidence levels are at or below a pre-determined value.

12. The method of claim 1, wherein the consuming application or process comprises a user interface console or an application programming interface (API) endpoint.

13. The method of claim 1, wherein the processing engine sequences the received vectorized data and responsive outputs by timestamp, creates subsets of time-series data to analyze requester behavior across groups of queries, and classifies events as benign or malicious based on output model monitoring prediction measurements.

14. The method of claim 1, wherein determining the confidence level comprises comparing a difference between a maximum prediction value and a minimum prediction value, selected from outputs within a defined window, to a threshold parameter that is tuned by determining an average prediction range over a period of time and setting the threshold as a percentage of the average prediction range.

15. The method of claim 1, wherein determining the confidence level comprises identifying, within a defined number of consecutive responsive outputs or a defined time period, whether at least a minimum percentage of prediction data points lie within a threshold parameter distance between a selected maximum prediction value and a selected minimum prediction values.

16. The method of claim 5, wherein the alert is assigned a severity level selected from high, medium, and low based on a percentage of prediction values within a threshold parameter distance between a selected maximum prediction value and a selected minimum prediction values over a defined window.

17. The method of claim 1, wherein the application programming interface of each sensor comprises an API gateway and a proxy application, the proxy application forwarding a request from the requesting user to the corresponding monitored machine learning model and to a publisher that forwards the vectorized data and responsive outputs to the central system environment for processing.

18. The method of claim 1, wherein the processing engine applies one or more machine learning models selected from unsupervised learning, clustering, time-series modeling, and classification modeling to the vectorized data and responsive outputs to detect a malicious act directed to the corresponding monitored machine learning model.

19. The method of claim 1, further comprising selecting, by a response engine, a response to apply to the request associated with the requesting user based at least in part on one or more of a category of the malicious act, a time or date of the response, or a history of attacks associated with the requesting user.

20. A system for detecting adversarial attacks on machine learning models being executed in a plurality of customer environments, the system comprising:

at least one processor; and memory storing instructions which, when executed by the at least one processor, result in operations comprising:

detecting, by a respective sensor executing within each of the plurality of customer environments, vectorized data being input into a corresponding monitored machine learning model and responsive outputs of such monitored machine learning model, the vectorized data detected by each sensor corresponding to a plurality of queries by a requesting user of the corresponding monitored machine learning model, each sensor being implemented as an application programming interface positioned between the requesting user and the corresponding monitored machine learning model, the application programming interface forwarding a request from the requesting user to the corresponding monitored machine learning model and to a publisher that adds data to a streaming queue for consumption by a processing engine;

receiving, by a central system multi-tenant environment, the vectorized data and the responsive outputs from the monitored machine learning models from each of the sensors;

determining, on a sensor-by-sensor basis by the processing engine forming part of the central system environment, a confidence level characterizing a likelihood of the vectorized data being part of a malicious act directed to the corresponding machine learning model; and providing data characterizing the determined confidence levels to a consuming application or process.

21. The system of claim 20, wherein the responsive outputs of the corresponding monitored machine learning model correspond to a predefined number of queries of such corresponding monitored machine learning model.

22. The system of claim 20, wherein the confidence level is determined by detecting that the responsive outputs within a particular window fall within a respective maximum value and a minimum value range corresponding to either a high confidence level or a low confidence level.

23. The system of claim 20, wherein the consuming application or process generates an alert based on one or more determined confidence levels when the confidence level is at or below a pre-determined value.

24. The system of claim 20, wherein the consuming application or process generates and sends a honeypot response to divert the requesting user away from the corresponding monitored machine learning model when subsequent requests are received when the confidence level is at or below a predetermined value.

25. The system of claim 20, wherein the consuming application or process, when the confidence level is at or below a predetermined value, disconnects or blocks the requesting user from the corresponding monitored machine learning model.

26. The system of claim 20, wherein the processing engine sequences the received vectorized data and responsive outputs by timestamp, creates subsets of time-series data to analyze requester behavior across groups of queries, and classifies events as benign or malicious based on output model monitoring prediction measurements.

27. The system of claim 20, wherein the confidence level is determined by comparing a difference between a maximum prediction value and a minimum prediction value, selected from outputs within a defined window, to a threshold parameter that is tuned by determining an average prediction range over a period of time and setting the threshold as a percentage of the average prediction range.

28. The system of claim 20, wherein the processing engine applies one or more machine learning models selected from unsupervised learning, clustering, time-series modeling, and classification modeling to the vectorized data and responsive outputs to detect a malicious act directed to the corresponding monitored machine learning model.

29. The system of claim 20, wherein the operations further comprise selecting, by a response engine, a response to apply to the request associated with the requesting user based at least in part on one or more of a category of the malicious act, a time or date of the response, or a history of attacks associated with the requesting user.

30. A system for detecting adversarial attacks on machine learning models being executed in a plurality of customer environments, the system comprising:

means for detecting, within each of the plurality of customer environments, vectorized data being input into a corresponding monitored machine learning model and responsive outputs of such monitored machine learning model, the vectorized data corresponding to a plurality of queries by a requesting user of the corresponding monitored machine learning model, the means for detecting being implemented as an application programming interface positioned between the requesting user and the corresponding monitored machine learning model, the application programming interface forwarding a request from the requesting user to the corresponding monitored machine learning model and to a publisher that adds data to a streaming queue;

means for receiving, in a central system multi-tenant environment, the vectorized data and the responsive outputs from the monitored machine learning models from each of the means for detecting;

means for determining, on a sensor-by-sensor basis, a confidence level characterizing a likelihood of the vectorized data being part of a malicious act directed to the corresponding machine learning model, the means for determining forming part of the central system environment and configured to consume data from the streaming queue; and means for providing data characterizing the determined confidence levels to a consuming application or process.

* * * * *